Aug. 31, 1965
J. C. WHITESIDES
3,203,487
ROTARY HOE GANG ASSEMBLY
Filed Jan. 9, 1964
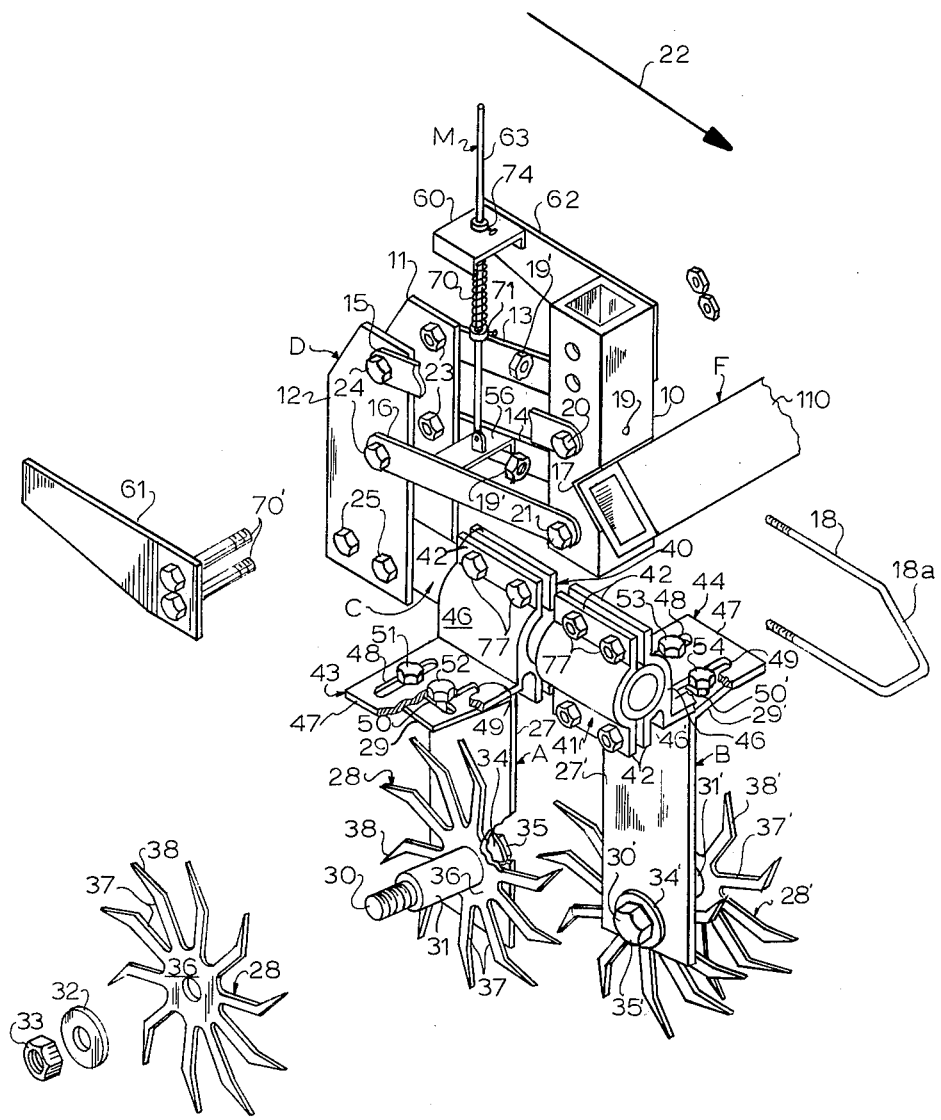
INVENTOR.
JACK C. WHITESIDES
BY Newton, Hopkins & Jones
ATTORNEYS

United States Patent Office 3,203,487
Patented Aug. 31, 1965

3,203,487
ROTARY HOE GANG ASSEMBLY
Jack C. Whitesides, Albany, Ga., assignor to Lilliston Implement Company, Albany, Ga., a corporation of Georgia
Filed Jan. 9, 1964, Ser. No. 336,777
4 Claims. (Cl. 172—548)

This invention relates to cultivators for cultivating row crops and more particularly, to a rotary hoe gang assembly for use on the frame of a rotary or other type cultivator.

Row crops are customarily cultivated by rotary cultivators having a frame drawn over the crop rows by a tractor or other suitable power means and having a plurality of gangs of rotary hoes extending downwardly from the frame. The rotary hoes of a gang generally have outwardly extending arms which penetrate the upper crust of the earth adjacent to crop rows and since weeds are customarily rooted only in the upper crust of the ground and crops are customarily deep rooted, this penetration of the upper crust of the ground adjacent to the crop rows results in weeds being rooted from the ground without damage to the crop. The rotary hoes also serve to kill the uprooted weeds by covering them with dirt and to increase or decrease the amount of dirt around the crop row depending upon their angular position with respect to the crop row.

Previous gangs of rotary hoes have customarily been assembled by extending a rigid support means over the crop rows between gangs of rotary hoes and between rotary hoes of each gang. The resulting previous rotary hoe gang assemblies have served to place rotary hoes of a gang on opposite sides of a crop row and each gang across a crop row. However, these previous rotary hoe gang assemblies are not well adapted to use on uneven terrain since the rigid support means tends to force the arms of some rotary hoes below the upper crust of the earth and to raise the arms of other rotary hoes above the earth when the terrain over which the cultivator is passing is uneven.

Moreover, by extending across crop rows, the support means used with previous rotary hoe gang assemblies has limited the use of these rotary hoe gang assemblies to crops which have little height and which can be cultivated by a cultivator without damage resulting from the support means striking the crop. In addition, previous rotary hoe gang assemblies have placed the rotary hoes of a gang on opposite sides of a crop row at a fixed and relatively short distance apart and this has limited the use of these rotary hoe gang assemblies to crops having foliage which does not extend outwardly to such an extent that it will be damaged by the rotary hoes of a gang on opposite sides of the crop row. This limited spacing between the rotary hoes of a gang on opposite sides of a crop row has also resulted in stones, rock clusters, and clods of earth becoming wedged between rotary hoes on opposite sides of a crop row and being pulled along and over the crop row so as to damage the crop.

In addition, previous rotary hoe gang assemblies have either made no provision for adjusting the angle of the rotary hoes with respect to a crop row or have required that the rotary hoes of a gang on opposite sides of a crop row be adjusted together as a group. Where the angle of the rotary hoes with respect to the crop row has not been adjustable, the previous rotary hoe gang assembly has been unsuited for throwing dirt toward or away from a crop row, and where the rotary hoes of a gang on opposite sides of a crop row have been adjustable together as a group, the result has been that the rotary hoes on one side of a crop row move dirt toward the crop row while the rotary hoes on the other side of the crop row move dirt away from the crop row. Thus, previous rotary hoe gang assemblies have been unsuited for throwing dirt toward a crop row from both sides of the crop row or for throwing dirt outwardly from both sides of a crop row.

The rotary hoe gang assembly for a cultivator disclosed herein overcomes these and other difficulties with previous gangs of rotary hoes used with cultivators. The rotary hoe gang assembly disclosed herein is easily and conveniently mounted on the frame of a cultivator and has two gang halves positioned on opposite sides of a crop row when the rotary hoe gang assembly is mounted on the cultivator frame and drawn along and over the crop row. Each gang half has a plurality of rotary hoes positioned on a shaft at the lower end of a support plate, and the upper ends of the support plates are attached to a support member. The horizontal distance between the support plates and the gang halves is adjustable to accommodate crop rows having foliage of varying width and the vertical lengths of the support plates place the support member well above the rotary hoes so as to permit the gang halves to pass on opposite sides of a crop row having substantial height.

In addition, the angular positions of the gang halves relative to a crop row are independently adjustable so that the gang halves on opposite sides of the crop row may both throw dirt away from or toward the crop row. This independent adjustment of the gang halves also permits the gang half on one side of a crop row to throw dirt away from the crop row and the gang half on the other side of the crop row to throw dirt toward the crop row. Moreover, it permits the gang half on one side of a crop row or the gang halves on both sides of the crop row to be inclined inward toward the crop beneath the foliage of the crop.

The support member is connected to a cultivator frame by a suspension mechanism which permits vertical motion of the support member and the gang halves while maintaining the support plates in a substantially fixed attitude relative to the cultivator frame. The vertical motion of the support member permits the gang halves to adjust their vertical positions to the terrain over which the rotary hoe gang assembly is passing and prevents the arms of the rotary hoes from penetrating the earth beyond the upper crust and damaging the roots of the crop being cultivated.

The gang halves can be displaced from each other along the length of the support member in the direction of motion of a cultivator so that the gang halves on opposite sides of a crop row are not opposite each other. This prevents stones, root clusters, and clods of earth from becoming wedged between the gang halves of the rotary hoe gang assembly disclosed herein and being carried along a crop row so as to damage the crop.

These and other features and advantages of the invention disclosed herein will be more clearly understood from the following detailed description and the accompanying drawing which is an exploded perspective view, partially cut away, of an embodiment of the rotary hoe gang assembly disclosed herein.

This drawing and the following detailed description disclose a specific embodiment of the invention, but the invention is not limited to the details disclosed since it may be embodied in other equivalent forms.

The rotary hoe gang assembly disclosed herein is best understood as comprising two gang halves A and B, a support member C to which the gang halves A and B are adjustably attached, and a suspension mechanism D by which the support member C is operatively connected to a channel member 110 of the frame F of a rotary or other type cultivator. The rotary hoe gang assembly may be attached to the frame F of any one of several known rotary or other type cultivators and the suspension mechanism D permits the rotary hoe gang assembly disclosed herein to easily replace or supplement the previous gangs of rotary hoes used on rotary or other type cultivators.

The suspension mechanism D has a box member 10, a right link plate 11, a left link plate 12, an upper right lever arm 13 and a lower right lever arm 14 extending between the box member 10 and the right link plate 11, and an upper left lever arm 15 and a lower left lever arm 16 extending between the box member 10 and the left link plate 12. The box member 10 resembles an elongated rectangular box and, when the rotary hoe gang assembly disclosed herein is mounted on the channel member 110 of a cultivator frame F, the long axis of the box member 10 is substantially vertical.

In the specific embodiment of the invention disclosed herein, the box member 10 is mounted in this position on a cultivator frame F by placing the channel member 110 of the cultivator frame F into a notch 17 and by extending the ends of a U-shaped pin 18 through holes 19 in the box member 10. The loop 18a of the pin 18 encircles the channel member 110, and when nuts 19' are placed on the extending ends of the pin 18, the box member 10 is firmly held against that portion of the channel member 110 extending into the notch 17 of the box member 10 by the pin 18. The channel member 110 is rectangular in cross-section in the embodiment of the invention described herein and the notch 17 has a corresponding shape. This arrangement for mounting the rotary hoe gang assembly disclosed herein on a cultivator frame F insures that the box member 10 is firmly attached to the cultivator frame F and is maintained in a fixed position with respect to the cultivator frame F with its long axis substantially vertical.

In order to form a parallel linkage suspension between the frame F and the support member C one end of the upper right lever arm 13 and one end of the upper left lever arm 15 are pivotally attached to opposite sides of the box member 10 by extending a bolt 20 through the upper right lever arm 13, the box member 10 and the upper left lever arm 15. Similarly, one end of the lower right lever arm 14 and one end of the lower left lever arm 16 are pivotally attached on opposite sides of the box member 10 by extending a belt 21 through the lower right lever arm 14, the box member 10 and the lower left lever arm 16. The lever arms 13, 14, 15, and 16 extend parallel to each other from the box member 10 in a direction opposite to the direction of travel 22 of the cultivator frame F. The right link plate 11 is pivotally attached to the extending ends of the upper right lever arm 13 and the lower right lever arm 14 by bolts 23. Similarly, the extending ends of the upper left lever arm 15 and the lower left lever arm 16 are pivotally attached to the left link plate 12 by bolts 24.

The link plates 11 and 12 extend downwardly from the lever arms 13, 14, 15 and 16 and one end of the support member C is fixedly positioned between the link plates 11 and 12 below the lever arms 13, 14, 15 and 16 by extending bolts 25 through the right link plate 11, the support member C and the left link plate 12. The lever arms 13, 14, 15 and 16 are of equal length and define, with the box member 10 and the link plates 11 and 12, two parallelograms. Thus, as the lever arms 13, 14, 15 and 16 pivot about the bolts 20, 21, 23 and 24, the link plates 11 and 12 move upward and downward while maintaining a constant orientation with respect to the box member 10. This is because the link plates 11 and 12 and the box member 10 are opposite sides of parallelograms regardless of the rotational position of the lever arms 13, 14, 15, and 16.

The support member C is a cylindrical tube and is positioned between the link plates 11 and 12 with its long axis perpendicular to the long axis of the box member 10. The support member C moves upward and downward with the link plates 11 and 12 and since the link plates 11 and 12 have a constant orientation with respect to the box member 10, the long axis of the support member C remains perpendicular to the long axis of the box member 10 regardless of the vertical position of the support member C. Thus, the suspension mechanism D serves to permit vertical motion of the support member C while maintaining the orientation of support member C constant with respect to box member 10 and the cultivator frame F on which the gang assembly disclosed herein is mounted. The support member C extends from the link plates 11 and 12 in the direction of travel 22 of the cultivator frame F and the rotary hoe gang assembly disclosed herein is positioned on the cultivator frame F so that the support member C will be directly above the crop row as the cultivator frame F is moved along the crop row to be cultivated by a tractor (not shown) or other suitable power means.

The gang halves A and B of the gang assembly disclosed herein are substantially identical to each other. Therefore only the gang half A will be described in detail. However the primes of the reference numbers used with respect to the gang half A have been used in FIG. 1 on the gang half B so that the construction of the gang half B will be fully understood from the description of the gang half A. The gang half A is a substantially rectangular support plate 27 having a plurality of rotary hoes 28 rotatably mounted at its lower end. The support plate 27 has a hole (not shown) at its lower end and is continuous with a tab 29 at its upper end. The support plate 27 and the tab 29 define a right angle and a bolt 30 is inserted through the hole (not shown) at the lower end of the support plate 27.

A plurality of rotary hoes 28 are rotatably positioned on the extending end of the bolt 30 with adjacent rotary hoes 28 being spaced apart by spacer cylinders 31. In the specific embodiment of the invention disclosed herein, there are two rotary hoes 28 on the bolt 30 separated by a single spacer cylinder 31. The rotary hoes 28 and the spacer cylinder 31 are maintained in position on the bolt 30 along with a washer 32 by a lock nut 33 threadably engaging that end of the bolt 30 most remote from the support plate 27. A washer 34 is between the head 35 of the bolt 30 and the support plate 27 to insure that the head 35 of the bolt 30 is not pulled through the hole (not shown) in the lower end of the support plate 27 by forces applied to the rotary hoes 28 on the bolt 30.

Each of the rotary hoes 28 has a central web 36 and a plurality of outwardly extending arms 37. Each of the arms 37 of the rotary hoes 28 extends outwardly along a radius of the central web 36, and each of the arms 37 is continuous at its outer extremity with a spike 38 which extends outwardly at an angle to the radius of the central web 36 along which the arm 37 extends. It will be understood that the rotary hoes 28 are of known type and that the spikes 38 extend in the direction 22 of frame F motion as the spikes 38 enter the ground.

An angle member 43 and an angle member 44 are adjustably mounted on opposite sides of the support member C using clamp members 40 and 41. Each of the angle members 43 and 44 has a clamp portion 46 and an extending portion 47. The clamp portions 46 of the angle members 43 and 44 and the clamp members 40 and 41 are formed as partial cylinders continuous with flanges 42, and the angle member 43 is mounted on the support member C by extending bolts 77 through the flanges 42 of the clamp portion 46 of the angle member 43 and of the clamp member 40. Similarly, the angle member 44 is mounted on the support member C by extending bolts 77 through the flanges 42 of the clamp portion 46 of the angle member 44 and of the clamp member 41.

The clamp members 40 and 41 serve to mount the angle members 43 and 44 at any of a plurality of positions along the length of the support member C and with extending portions 47 of the angle members 43 and 44 at any one of a plurality of angles with respect to a plane of reference containing the long axis of the support member C and the long axis of the box member 10. It will be understood that when the angle members 43 and 44 are mounted on the support member C using the clamp members 40 and 41, the angle members 43 and 44 are displaced from each other along the length of the support member C. However, it will also be understood that bolts 77 may be extended between and through the flanges 42 of the clamp portions 46 of the angle members 43 and 44 so that the angle members 43 and 44 are directly opposite each other on opposite sides of the support member C. Each of the extending portions 47 of the angle members 43 and 44 has a slot 48 and a slot 49 parallel to each other and extending toward the support member C. The tab 29 has a slot 50 with the centerline of the slot 50 in a plane of reference parallel to the support plate 27 and perpendicular to the centerline of the bolt 30. Similarly, the tab 29' has a slot 50' with a centerline in a plane of reference parallel to the support plate 27' and perpendicular to the centerline of the bolt 30'.

The angle member 43 is used to attach the gang half A to the support member C by extending a bolt 51 through the slot 48 in the extending portion 47 of the angle member 43 and slot 50 in the tab 29 and by extending a bolt 53 through the slot 49 in the extending portion 47 of the angle member 43 and the slot 50 in the tab 29. Similarly, the angle member 44 is used to attach the gang half B to the support member C by extending a bolt 53 through the slot 48 in the extending portion 47 of the angle member 44 and the slot 50' in the tab 29' and by extending a bolt 54 through the slot 49 in the extending portion 47 of the angle member 44 and the slot 50' in the tab 29'.

The slot 50 in the tab 29 is of sufficient length for the bolt 51 to be in any position along the length of the slot 48 in the angle member 43 while the bolt 52 is in any position along the length of the slot 49 in the angle member 43. Similarly, the slot 50' is of sufficient length for the bolt 53 to be in any position in the slot 48 in the angle member 44 while the bolt 54 is in any position in the slot 49 in the angle member 44. Thus, the tab 29 may be attached to the angle member 43 with the centerline of the slot 50 parallel to or at any one of a plurality of angles to the long axis of the support member C. Similarly the tab 29' may be attached to the support member 44 with the centerline of the slot 50' parallel to or at any one of a plurality of angles to the long axis of the support member C. The result of this arrangement for attaching the gang half A and the gang half B to the support member C is that the plurality of rotary hoes 28 on the bolts 30 and 30' may be positioned to rotate about an axis perpendicular to or at any one of a plurality of angles with respect to the long axis of the support member C by varying the relationship between the slots 48 and 49 and the slots 50 and 50'.

It will now be understood that when the box member 10 of the suspension mechanism D is fixedly attached to channel member 110 of a cultivator frame F, the support member C extends from between the link plates 11 and 12 in the direction of travel 22 of the cultivator frame F along a crop row, the gang half A is on one side of the crop row, and the gang half B is on the opposite side of the crop row. The suspension mechanism D permits the support member C and the gang halves A and B to move upward and downward as the terrain over which the gang halves A and B move varies while maintaining the gang halves A and B at a constant orientation with respect to the box member 10 and the cultivator frame F.

The specific orientation of the gang halves A and B with respect to the cultivator frame F and with respect to a crop row depends upon the positions in which the tabs 29 and 29' are attached to the angle members 43 and 44 and the positions in which the angle members 43 and 44 are mounted on the support member C. The gang halves A and B may be positioned so that the rotary hoes 28 of both or one of the gang halves A and B rotate toward the crop row, rotate away from the crop row, rotate in planes parallel to the direction of travel 22 of the frame F, or rotate in any other similar planes of rotation desired. Thus, the rotary hoe gang assembly disclosed herein provides a split gang of rotary hoes which permits dirt to be moved toward a crop row from both sides of the crop row, which permits dirt to be moved away from the crop row from both sides of the crop row, and which permits substantially any other cultivating operation desired.

The distance between the tabs 29 and 29' of the gang halves A and B is adjustable in accordance with the relationship between the slots 48 and 49 in the angle members 43 and 44 and the slots 50 and 50' in the tabs 29 and 29', and the clamp members 40 and 41 permit the support plates 27 and 27' of the gang halves A and B to be substantially vertical, to be inclined inwardly or outwardly, or to be at any of a plurality of similar positions as they extend downward from the support member C. This further increases the adaptability of the rotary hoe gang assembly disclosed herein to various cultivating operations by permitting the gang halves A and B to be placed sufficiently far apart so as not to damage the foliage of even relatively large crops while at the same time permitting the gang halves A and B to extend inwardly under the foliage.

Moreover, when the gang halves A and B are attached to the support member C so that the gang half A is displaced along the length of the support member C from the gang half B, it is substantially impossible for rocks, clumps of roots, or large clods of earth to become wedged between the gang halves A and B. Thus, it will be understood that this possible cause of damage to a crop is eliminated by the gang assembly disclosed herein. It will also be understood that the support plates 27 and 27' may be of any selected length, and that by proper selection of the lengths of the support plates 27 and 27', the support member C is maintained well above a crop row so as to permit the rotary hoe gang assembly disclosed herein to be use on crops having substantial height.

Although the weight of the rotary hoe gang assembly disclosed herein tends to force the arms 37 of the rotary hoes 28 into the upper crust of the ground being cultivated, the gang assembly also has a positioning mechanism M which further urges the link plates 11 and 12, the support member C, and the gang halves A and B downward toward the ground. The positioning mechanism M comprises a lower transverse plate 56 fixedly extending between the lower right lever arm 14 and the lower left lever arm 16; and upper transverse plate 60 fixedly positioned between bracket arms 61 and 62 extending from opposite sides of the box member 10 and over the lever arms 13, 14, 15 and 16; a positioning shaft 63 having its lower end pivotally attached to the lower transverse plate 56 and slidably inserted through the upper transverse plate 60; a collar 71 adjustably fixed on the positioning shaft 63 between the lower transverse plate 56 and the upper transverse plate 60; and a spring 70 on the positioning shaft 63 and extending between the collar 71 and the upper transverse plate 60 so as to urge the collar 71, the positioning shaft 63, the lower transverse plate 56, the lower lever arms 14 and 16, and the gang halves A and B downward. The bracket arms 61 and 62 are fixedly attached to opposite sides of the box member 10 by extending bolts 70 through the bracket arm 61, the box member 10 and the bracket arm 62.

It will be understood that this positioning mechanism insures that the gang halves A and B are urged downward with sufficient force for the spikes 38 of the rotary hoes 28 to always penetrate the upper crust of the ground being cultivated. It will also be understood that the position of the collar 71 on the positioning shaft 63 will determine the compression of the spring 70 at any particular vertical position of the gang halves A and B and that the force with which the gang halves A and B are urged downward may be adjusted by varying the position of the collar 71 along the positioning shaft 63.

In order to hold the gang halves A and B upward when it is desired that the spikes 38 of the rotary hoes 28 not engage the ground over which the cultivator frame F is moving, a stop collar 74 stops downward motion of the positioning shaft 63 when it engages the upper transverse plate 60 and the stop collar 74 is positioned on the positioning shaft 63 to stop downward motion of the positioning shaft 63 at that point at which the gang halves A and B are the desired height above the ground.

It will be obvious to those skilled in the art that many variations may be made in the embodiment here chosen for the purpose of illustrating the present invention without departing from the scope thereof as defined by the appended claims.

What is claimed as invention is:

1. A rotary hoe gang assembly for a cultivator adapted to be moved parallel to and over a crop row and adapted to support a plurality of rotary hoes each of the type having a plurality of rigid tines extending substantially in a single plane and said tines extending perpendicular to the axis of rotation of each hoe, said gang assembly comprising;
    (A) a frame,
    (B) a support member constructed to extend directly over a crop row and to extend in a plane substantially parallel to the surface of the soil of the crop row,
    (C) a suspension means connected between said support member and said frame for suspending said support member from said frame and for maintaining said support member substantially parallel to the surface of the soil of the crop row,
    (D) a first support means extending downwardly from one side of said support member for positioning on one side of said crop row,
    (E) a second support means extending downwardly from said support member from the side opposite to said one side for positioning on the opposite side of said crop row,
    (F) a first rotary hoe rotatably connected to said first support means,
    (G) a second rotary hoe rotatably connected to said second support means,
    (H) means for adjustably displacing said first support means and said second support means from each other in a direction generally parallel to the crop row,
    (I) means for adjustably displacing said first support means and said second support means from each other in a direction generally perpendicular to the crop row,
    (J) means for adjustably angling said first rotary hoe and said second rotary hoe about axes generally parallel to the crop row, and
    (K) means for adjustably angling said first rotary hoe and said second rotary hoe about axes generally perpendicular to the surface of the soil of the crop row.

2. In a rotary hoe gang assembly of the type having a plurality of rotary hoes each having rigid tires extending in a plane substantially perpendicular to their axis of rotation; the combination therewith of a frame, a support member having an axis adapted to be disposed directly above and parallel to a crop row, means for suspending said support member from said frame at varying distances and for maintaining said support member parallel to said crop row, means for suspending from said support member a first gang of rotary hoes on one side of said support member axis and a second gang of rotary hoes on the other side of said support member axis, means for variably displacing said first gang of rotary hoes and said second gang of rotary hoes from each other along the length of said support member axis, means for variably displacing said first gang of rotary hoes and said second gang of rotary hoes from each other across said support member axis, means for angling said gangs of rotary hoes about axes parallel to said support member axis, and means for angling said gangs of rotary hoes about axes perpendicular to said support member axis.

3. In a soil cultivating device of the type utilized for cultivating soil in a crop row and having a plurality of rotary hoes each having a plurality of rigid tires extending in a plane disposed perpendicular to its axis of rotation, the combination therewith of a frame, a support member, a parallel linkage means suspending said support member from said frame whereby said support member is adapted to be disposed directly above a crop row, a first rotary hoe suspended from one side of said support member and adapted to penetrate the soil in one side of the crop row, a second rotary hoe suspended from another side of said support member and adapted to penetrate the soil on the other side of said crop row, means for adjusting the distance between said rotary hoes in a direction generally parallel to the crop row, means for adjusting the distance between said rotary hoes in a direction generally transverse to the crop row, means for angling said rotary hoes about an axis generally parallel to the crop row and means for angling said rotary hoes about an axis generally perpendicular to the crop row.

4. A rotary hoe gang assembly as claimed in claim 3 and further comprising means for limiting the distance between said frame and said support member.

References Cited by the Examiner

UNITED STATES PATENTS

| | | | |
|---|---|---|---|
| 329,609 | 11/85 | Windsor | 172—696 |
| 359,321 | 3/87 | Inzer | 172—654 |
| 805,252 | 11/05 | Winters | 172—743 X |
| 1,241,110 | 9/17 | Hackfeld | 172—651 |
| 2,941,606 | 6/60 | Gillette | 172—307 X |
| 3,080,004 | 3/63 | McNair | 172—600 X |
| 3,082,829 | 3/63 | Buddingh et al. | 172—184 |

ABRAHAM G. STONE, *Primary Examiner.*

T. GRAHAM CRAVER, *Examiner.*